(12) United States Patent
Ihara

(10) Patent No.: US 12,705,749 B2
(45) Date of Patent: Aug. 11, 2026

(54) IMAGE PROCESSING APPARATUS, METHOD AND PROGRAM, AND LEARNING APPARATUS, METHOD AND PROGRAM FOR EXTRACTING IMAGE FROM TARGET IMAGE BY TRAINED EXTRACTION MODEL

(71) Applicant: FUJIFILM Corporation, Tokyo (JP)

(72) Inventor: Satoshi Ihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 311 days.

(21) Appl. No.: 18/327,027

(22) Filed: May 31, 2023

(65) Prior Publication Data

US 2023/0306608 A1 Sep. 28, 2023

Related U.S. Application Data

(63) Continuation of application No. PCT/JP2021/042482, filed on Nov. 18, 2021.

(30) Foreign Application Priority Data

Jan. 18, 2021 (JP) ................................ 2021-005804

(51) Int. Cl.
*G06T 7/11* (2017.01)
*G06T 3/40* (2006.01)
*G06T 7/00* (2017.01)

(52) U.S. Cl.
CPC .................. *G06T 7/11* (2017.01); *G06T 3/40* (2013.01); *G06T 7/0012* (2013.01); *G06T 2207/20084* (2013.01); *G06T 2207/30056* (2013.01)

(58) Field of Classification Search
CPC ............ G06T 7/11; G06T 3/40; G06T 3/4046
See application file for complete search history.

(56) References Cited

U.S. PATENT DOCUMENTS 8,724,912 B2 * 5/2014 Noguchi ................ H04N 19/29 382/173
9,996,890 B1 6/2018 Cinnamon et al.
(Continued)

FOREIGN PATENT DOCUMENTS

JP 2013020600 1/2013
JP 2019021313 2/2019
(Continued)

OTHER PUBLICATIONS

"International Search Report (Form PCT/ISA/210) of PCT/JP2021/042482," mailed on Feb. 1, 2022, with English translation thereof, pp. 1-5.

(Continued)

*Primary Examiner* — Barbara D Reinier
(74) *Attorney, Agent, or Firm* — JCIPRNET

(57) ABSTRACT

A processor is configured to: reduce a target image to derive a reduced image; extract a region of a target structure from the reduced image to derive a reduced structure image including the region of the target structure; extract a corresponding image corresponding to the reduced structure image from the target image; and input the corresponding image and the reduced structure image into an extraction model constructed by machine-learning a neural network to extract a region of the target structure included in the corresponding image from the extraction model.

7 Claims, 9 Drawing Sheets

(56) References Cited

U.S. PATENT DOCUMENTS

| | | | | |
|---|---|---|---|---|
| 10,572,963 | B1 | 2/2020 | Cinnamon et al. | |
| 11,328,392 | B2 * | 5/2022 | Bai | G06F 18/251 |
| 2017/0154420 | A1 * | 6/2017 | Barnes | G06T 7/11 |
| 2019/0019318 | A1 | 1/2019 | Cinnamon et al. | |
| 2020/0193666 | A1 | 6/2020 | Cinnamon et al. | |
| 2020/0218961 | A1 | 7/2020 | Kanazawa et al. | |
| 2023/0386067 | A1 * | 11/2023 | De Nigris | G01B 11/00 |

FOREIGN PATENT DOCUMENTS

| | | |
|---|---|---|
| JP | 2020038572 | 3/2020 |
| JP | 2020038574 | 3/2020 |
| JP | 2020528176 | 9/2020 |

OTHER PUBLICATIONS

“Written Opinion of the International Searching Authority (Form PCT/ISA/237) of PCT/JP2021/042482,” mailed on Feb. 1, 2022, with English translation thereof, pp. 1-8.

“Notice of Reasons for Refusal of Japan Counterpart Application”, issued on Oct. 21, 2025, with English translation thereof, p. 1-p. 6.

“Decision of Refusal of Japan Counterpart Application”, issued on Feb. 17, 2026, with English translation thereof, p. 1-p. 7.

* cited by examiner

G0
GS0
22
GS0
23
GS1
G1
24
G2
25

G1
GS2
30A
30B
30
F1
31
F2
F2
32
F3
F3
33
F4
34
F5
35
F6
36
G2

START
ST1
ACQUIRE SUPERVISED TRAINING DATA
ST2
LEARNING
END

START
ST11
DERIVE REDUCED IMAGE
ST12
EXTRACT LIVER REGION FROM REDUCED IMAGE
ST13
DERIVE REDUCED LIVER IMAGE
ST14
EXTRACT CORRESPONDING IMAGE
ST15
EXTRACT LIVER REGION FROM CORRESPONDING IMAGE
ST16
DISPLAY
END

IMAGE PROCESSING APPARATUS, METHOD AND PROGRAM, AND LEARNING APPARATUS, METHOD AND PROGRAM FOR EXTRACTING IMAGE FROM TARGET IMAGE BY TRAINED EXTRACTION MODEL

CROSS-REFERENCE TO RELATED APPLICATIONS

The present application is a Continuation of PCT International Application No. PCT/JP2021/042482, filed on Nov. 18, 2021, which claims priority to Japanese Patent Application No. 2021-005804, filed on Jan. 18, 2021. Each application above is hereby expressly incorporated by reference, in its entirety, into the present application.

BACKGROUND

Technical Field

The present disclosure relates to an image processing apparatus, method, and program, and a learning apparatus, method, and program.

Related Art

In recent years, a machine learning technology using deep learning has attracted attention. In particular, various models have been proposed for segmenting an object included in an image by learning a convolutional neural network (hereinafter referred to as a CNN), which is one of multilayer neural networks in which a plurality of processing layers are hierarchically connected, by deep learning. In addition, a method for classifying the segmented regions has also been proposed. For example, JP2019-021313A proposes a method in which an input image is normalized, a given region is extracted from the normalized image, and the extracted region is applied to the input image to classify objects in the given region in the input image.

However, the method described in JP2019-021313A cannot extract an object included in an input image at high speed and with high accuracy.

SUMMARY OF THE INVENTION

The present disclosure has been made in view of the above circumstances, and an object of the present disclosure is to enable high-speed and accurate extraction of an object included in an image.

According to an aspect of the present disclosure, there is provided an image processing apparatus comprising at least one processor, in which the processor is configured to: reduce a target image to derive a reduced image; extract a region of a target structure from the reduced image to derive a reduced structure image including the region of the target structure; extract a corresponding image corresponding to the reduced structure image from the target image; and input the corresponding image and the reduced structure image into an extraction model constructed by machine-learning a neural network to extract a region of the target structure included in the corresponding image from the extraction model.

In the image processing apparatus according to the aspect of the present disclosure, the extraction model may consist of a plurality of processing layers that perform convolution processing, and an input layer may have two channels, the processor may be configured to: enlarge the reduced structure image to the same size as the corresponding image to derive an enlarged structure image; and input the enlarged structure image and the corresponding image respectively to the two channels of the input layer of the extraction model.

In the image processing apparatus according to the aspect of the present disclosure, the neural network may consist of a plurality of processing layers that perform convolution processing, and the processing layer that processes an image having the same resolution as the reduced structure image may have an additional channel for inputting the reduced structure image, and the processor may be configured to input the reduced structure image to the additional channel.

In the image processing apparatus according to the aspect of the present disclosure, the processor may be configured to: divide the region of the target structure extracted from the reduced image and derive a divided and reduced structure image including each of the divided regions of the target structure; derive a plurality of divided corresponding images corresponding to the respective divided and reduced structure images from the corresponding image; and extract the region of the target structure included in the corresponding image in units of the divided corresponding image and the divided and reduced structure image.

According to another aspect of the present disclosure, there is provided a learning apparatus comprising at least one processor, in which the processor is configured to: construct an extraction model that extracts, in a case where a reduced structure image derived from a reduced image of a target image including a target structure and a corresponding image corresponding to the reduced structure image extracted from the target image are input, a region of the target structure from the corresponding image, by machine-learning a neural network using, as supervised training data, a first image including a region of the target structure extracted from a reduced image of an original image including the target structure, a second image corresponding to the first image extracted from the original image, and correct answer data representing an extraction result of the target structure from the second image.

According to another aspect of the present disclosure, there is provided an image processing method comprising: reducing a target image to derive a reduced image; extracting a region of a target structure from the reduced image to derive a reduced structure image including the region of the target structure; extracting a corresponding image corresponding to the reduced structure image from the target image; and inputting the corresponding image and the reduced structure image into an extraction model constructed by machine-learning a neural network to extract a region of the target structure included in the corresponding image from the extraction model.

According to another aspect of the present disclosure, there is provided a learning method comprising: constructing an extraction model that extracts, in a case where a reduced structure image derived from a reduced image of a target image including a target structure and a corresponding image corresponding to the reduced structure image extracted from the target image are input, a region of the target structure from the corresponding image, by machine-learning a neural network using, as supervised training data, a first image including a region of the target structure extracted from a reduced image of an original image including the target structure, a second image corresponding to the first image extracted from the original image, and correct answer data representing an extraction result of the target structure from the second image.

In addition, the image processing method and the learning method according to the aspects of the present disclosure may be provided as a program for causing a computer to execute the methods.

According to the aspects of the present disclosure, an object included in an image can be extracted at high speed and with high accuracy.

DETAILED DESCRIPTION

Figures 1, 2:
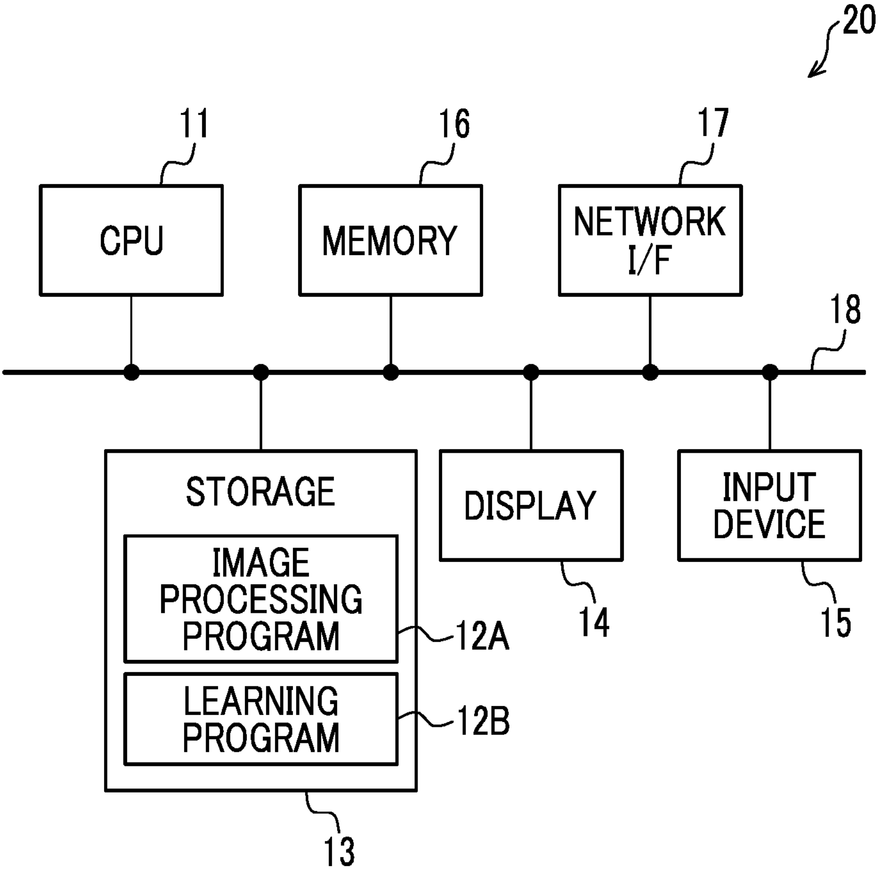
FIG. 1 is a diagram showing a schematic configuration of a diagnosis support system to which an image processing apparatus and a learning apparatus according to an embodiment of the present disclosure are applied.
FIG. 2 is a diagram showing a schematic configuration of the image processing apparatus and the learning apparatus according to the present embodiment.

Hereinafter, an embodiment of the present disclosure will be described with reference to the drawings. First, a configuration of a medical information system to which an image processing apparatus and a learning apparatus according to the present embodiment are applied will be described. FIG. 1 is a diagram showing a schematic configuration of the medical information system. In the medical information system shown in FIG. 1, a computer 1 encompassing an image processing apparatus and a learning apparatus according to the present embodiment, an imaging apparatus 2, and an image storage server 3 are connected via a network 4 in a communicable state.

The computer 1 encompasses an image processing apparatus and the learning apparatus according to the present embodiment, and an image processing program and a learning program according to the present embodiment are installed in the computer 1. The computer 1 may be a workstation or a personal computer directly operated by a doctor performing diagnosis, or may be a server computer connected to a workstation and to a personal computer via a network. The image processing program and the learning program are stored in a storage apparatus of a server computer connected to the network or in a network storage in a state in which the network storage can be accessed from the outside, and are downloaded to and installed on the computer 1 used by a doctor in response to a request. Alternatively, the image processing program is recorded on a recording medium, such as a digital versatile disc (DVD) or a compact disc read only memory (CD-ROM), and distributed, and is installed on the computer 1 from the recording medium.

The imaging apparatus 2 is an apparatus that generates a three-dimensional image representing diagnosis target parts of a subject by imaging the part, and the imaging apparatus 2 is, specifically, a computed tomography (CT) apparatus, a magnetic resonance imaging (MRI) apparatus, a positron emission tomography (PET) apparatus, or the like. A three-dimensional image consisting of a plurality of slice images generated by the imaging apparatus 2 is transmitted to and saved in the image storage server 3. In the present embodiment, the imaging apparatus 2 is a CT apparatus, and a CT image of the thoracoabdominal region of a subject is generated as a three-dimensional image.

The image storage server 3 is a computer that saves and manages various types of data, and includes a large-capacity external storage apparatus and database management software. The image storage server 3 communicates with another apparatus via the wired or wireless network 4, and transmits/receives image data or the like. Specifically, various types of data including image data of a three-dimensional image generated by the imaging apparatus 2 are acquired via a network and saved in a recording medium such as a large-capacity external storage apparatus and managed. The storage format of the image data and the communication between the respective apparatuses via the network 4 are based on a protocol such as digital imaging and communication in medicine (DICOM). In addition, the image storage server 3 stores supervised training data, which will be described later.

Next, the image processing apparatus and the learning apparatus according to the present embodiment will be described. FIG. 2 illustrates the hardware configuration of the image processing apparatus and the learning apparatus according to the present embodiment. As shown in FIG. 2, the image processing apparatus and the learning apparatus (hereinafter sometimes represented by the image processing apparatus) 20 includes a central processing unit (CPU) 11, a non-volatile storage 13, and a memory 16 as a temporary storage area. Further, the image processing apparatus 20 includes a display 14 such as a liquid crystal display, an input device 15 such as a keyboard and a mouse, and a network interface (I/F) 17 connected to the network 4. The CPU 11, the storage 13, the display 14, the input device 15, the memory 16, and the network I/F 17 are connected to a bus 18. The CPU 11 is an example of a processor in the present disclosure.

The storage 13 is realized by a hard disk drive (HDD), a solid state drive (SSD), a flash memory, and the like. An image processing program 12A and a learning program 12B are stored in the storage 13 as a storage medium. The CPU 11 reads out the image processing program 12A and the learning program 12B from the storage 13, then loads the read-out programs into the memory 16, and executes the loaded image processing program 12A and learning program 12B.

Figure 3:
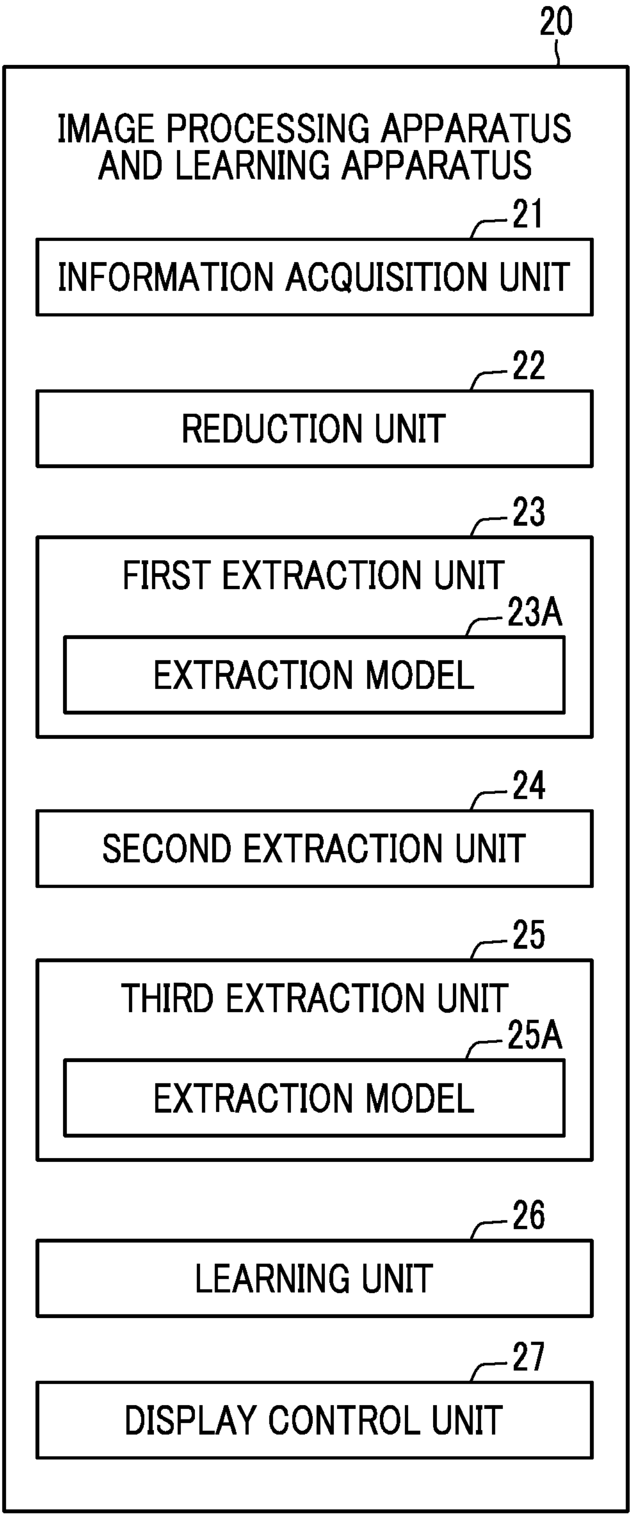
FIG. 3 is a functional configuration diagram of the image processing apparatus and the learning apparatus according to the present embodiment.

Next, a functional configuration of the image processing apparatus and the learning apparatus according to the present embodiment will be described. FIG. 3 is a diagram showing a functional configuration of the image processing apparatus and the learning apparatus according to the present embodiment. As shown in FIG. 3, the image processing apparatus 20 comprises an information acquisition unit 21, a reduction unit 22, a first extraction unit 23, a second extraction unit 24, a third extraction unit 25, a learning unit 26, and a display control unit 27. Then, the CPU 11 executes the image processing program 12A, so that the CPU 11 functions as the information acquisition unit 21, the reduction unit 22, the first extraction unit 23, the second extraction unit 24, the third extraction unit 25, and the display control unit 27. In addition, the CPU 11 executes the learning program 12B, so that the CPU 11 functions as the learning unit 26. In the present embodiment, it is assumed that a target image G0 is a CT image including the thoracoabdominal region of a human body, and a region of the liver is extracted from the target image G0 as a target structure.

The information acquisition unit 21 acquires a target image G0 to be processed from the image storage server 3 in response to an instruction from the input device 15 provided by an operator. In addition, the information acquisition unit 21 acquires supervised training data from the image storage server 3 for training an extraction model, which will be described later.

Figure 4:
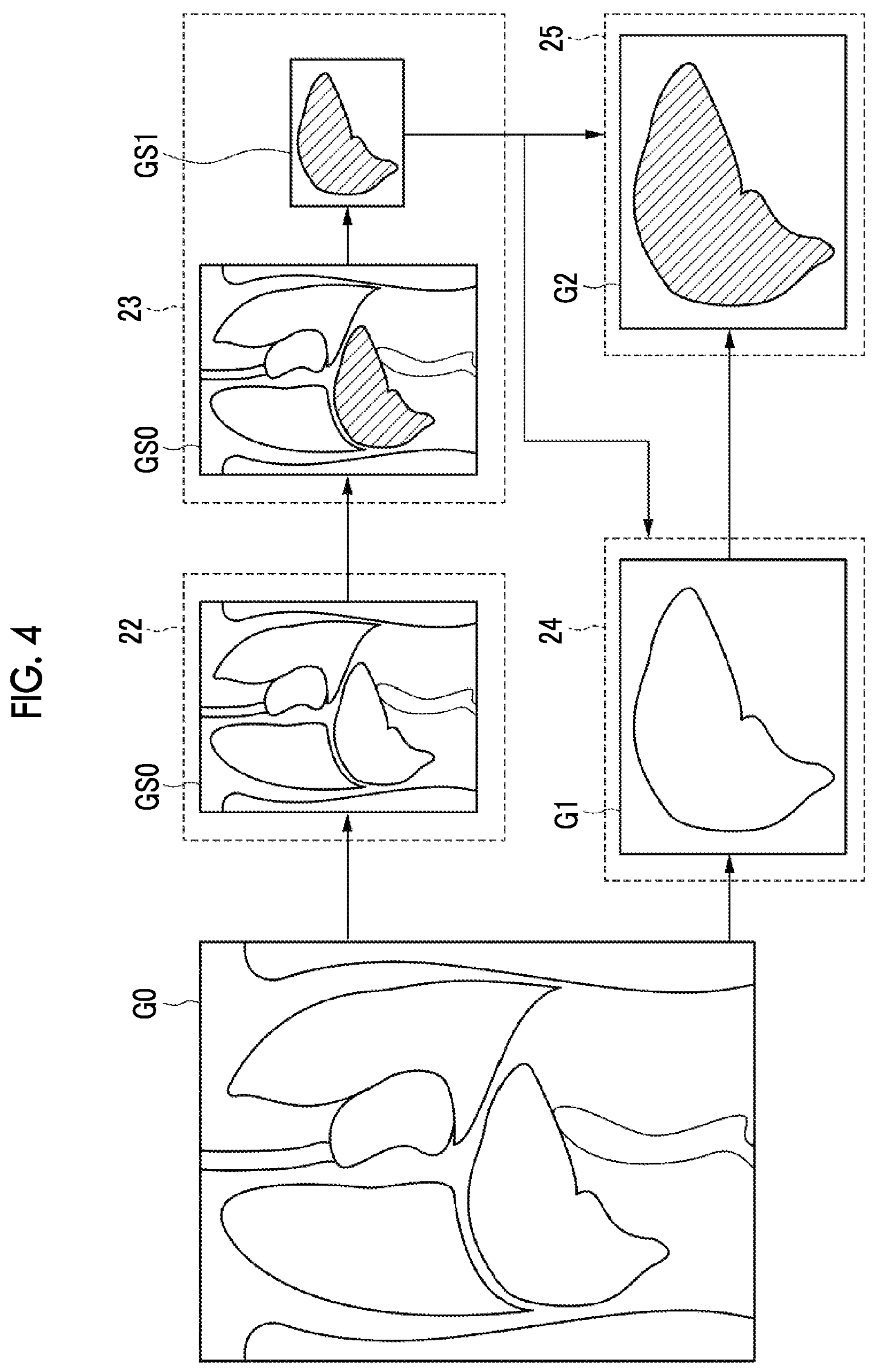
FIG. 4 is a diagram schematically showing a process performed in the present embodiment.

Hereinafter, a process performed by the reduction unit 22, the first extraction unit 23, the second extraction unit 24, and the third extraction unit 25 will be described with reference to FIG. 4.

The reduction unit 22 reduces the target image G0 to derive a reduced image GS0. A reduction rate can be set to, for example, ¼, but the reduction rate is not limited thereto. For example, the reduction rate can be set to ½ to 1/16.

The first extraction unit 23 extracts a liver region as a region of the target structure from the reduced image GS0. In the present embodiment, the first extraction unit 23 extracts the liver region from the reduced image GS0 using an extraction model 23A constructed by machine-learning the neural network. The extraction model 23A consists of a neural network that has undergone machine learning such that a liver region is extracted from a CT image in a case where the CT image including the thoracoabdominal region of the human body is input. Note that, in FIG. 4, in the reduced image GS0, hatching is applied to the extracted liver region.

As methods for extracting the liver region from the reduced image GS0, in addition to the method using the extraction model 23A, threshold processing based on voxel values of the target image G0, a region growing method based on seed points representing the liver region, a template matching method based on the shape of the liver, a graph cut method, and the like can be used.

Then, the first extraction unit 23 derives a reduced liver image GS1 by clipping a rectangular region including the liver region in the reduced image GS0.

The second extraction unit 24 extracts a region corresponding to the reduced liver image GS1 from the target image G0 as a corresponding image. Specifically, the second extraction unit 24 enlarges the reduced liver image GS1 to have the same resolution as the target image G0, and extracts, as a corresponding image G1, a region in the target image G0 that has the greatest correlation with the enlarged reduced liver image GS1.

The third extraction unit 25 extracts a liver region included in the corresponding image G1. To this end, the third extraction unit 25 has an extraction model 25A constructed by machine-learning a neural network such that the liver region included in the corresponding image G1 is extracted in a case where the corresponding image G1 and the reduced liver image GS1 are input.

Figure 5:
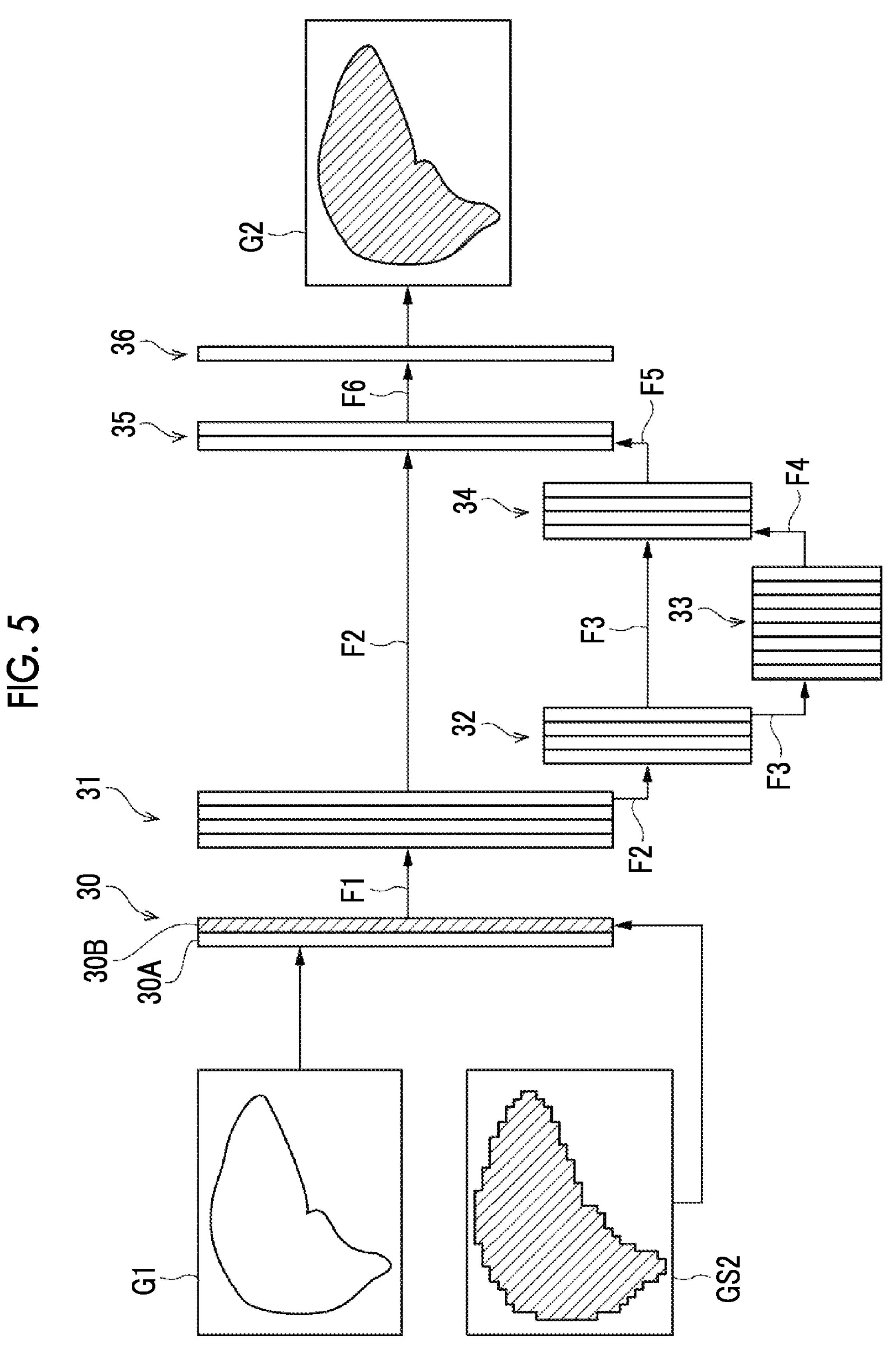
FIG. 5 is a diagram schematically showing a configuration of an extraction model.

FIG. 5 is a diagram schematically showing a configuration of the extraction model 25A. As shown in FIG. 5, in the present embodiment, the extraction model 25A included in the third extraction unit 25 is configured by U-Net, which is a kind of convolutional neural network (CNN). The U-Net shown in FIG. 5 is composed of seven layers of an input layer 30, a first layer 31 to a fifth layer 35, and an output layer 36.

In the present embodiment, the third extraction unit 25 derives a reduced liver image GS2 in which the reduced liver image GS1 is enlarged to the same resolution as the corresponding image G1. Then, the third extraction unit 25 inputs the corresponding image G1 and the enlarged reduced liver image GS2 into the extraction model 25A. To this end, the input layer 30 has a channel 30A to which the corresponding image G1 is input and a channel 30B to which the reduced liver image GS2 is input. Note that, as the enlarged reduced liver image GS2, an enlarged reduced liver image derived by the second extraction unit 24 in the case of extracting the corresponding image G1 may be used.

The input layer 30 concatenates, that is, combines and convolves the corresponding image G1 and the enlarged reduced liver image GS2 with a predetermined kernel, and outputs a feature map F1 in which the corresponding image G1 and the enlarged reduced liver image GS2 are integrated. The feature map F1 is input to the first layer 31. In the present embodiment, for example, a 3×3 kernel is used for the convolution, but the convolution is not limited thereto.

The first layer 31 has, for example, four convolutional layers. A feature map F2 output from the first layer 31 is input to the fifth layer 35. Also, the feature map F2 is pooled, its size is reduced to ½, and the feature map F2 is input to the second layer 32. In the pooling, the maximum value among the four pixels is employed, but the present disclosure is not limited thereto.

The second layer 32 has, for example, four convolutional layers. A feature map F3 output from the second layer 32 is input to the fourth layer 34. Also, the feature map F3 is pooled, its size is reduced to ½, and the feature map F3 is input to the third layer 33.

The third layer 33 has, for example, eight convolutional layers. The feature map F4 output from the third layer 33 is upsampled, its size is doubled, and the feature map F4 is input to the fourth layer 34.

The fourth layer 34 has, for example, four convolutional layers, and performs the convolution operation by integrating the feature map F3 from the second layer 32 and the upsampled feature map F4 from the third layer 33. A feature map F5 output from the fourth layer 34 is upsampled, its size is doubled, and the feature map F5 is input to the fifth layer 35.

The fifth layer 35 has, for example, two convolutional layers, and performs the convolution operation by integrating the feature map F2 from the first layer 31 and the upsampled feature map F5 from the fourth layer 34. A feature map F6 output from the fifth layer 35 is input to the output layer 36.

The output layer 36 outputs an extracted image G2 obtained by extracting the liver region from the corresponding image G1.

Figure 6:
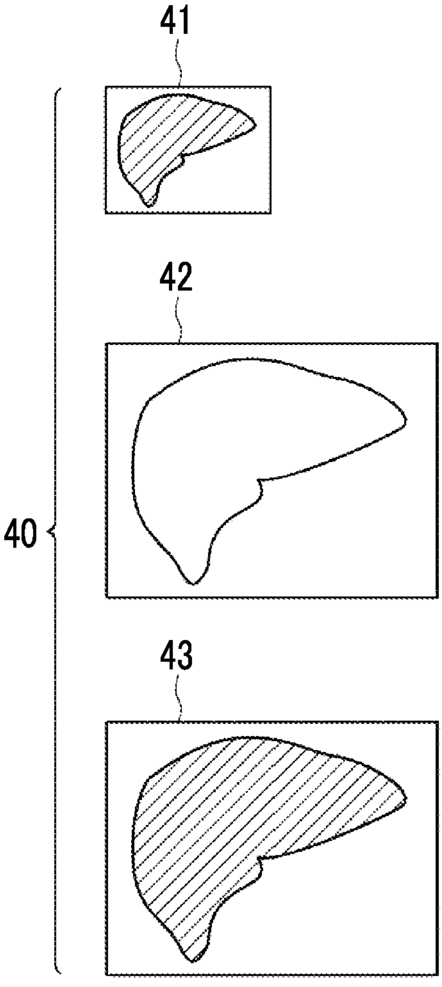
FIG. 6 is a diagram showing supervised training data used for learning.

The extraction model 25A is constructed by machine-learning a neural network using a large amount of supervised training data. The learning unit 26 performs learning of the neural network. FIG. 6 is a diagram showing an example of supervised training data used for learning. As shown in FIG. 6, supervised training data 40 consists of a teacher-reduced liver image 41 generated by extracting the liver from a reduced image obtained by reducing a medical image, a teacher-corresponding image 42 obtained by extracting a region corresponding to the teacher-reduced liver image 41 in the medical image, and correct answer data 43. The teacher-reduced liver image 41 is an image in which the liver region is masked in the reduced image. The correct answer data 43 is an image in which the liver region is masked in the teacher-corresponding image 42. The teacher-reduced liver image 41 and the correct answer data 43 are generated by extracting a region of the liver while a user views the image. Note that the teacher-reduced liver image 41 is an example of a first image, and the teacher-corresponding image 42 is an example of a second image.

The learning unit 26 inputs the teacher-reduced liver image 41 and the teacher-corresponding image 42 to the neural network, and causes the neural network to extract the liver region in the teacher-corresponding image 42. Then, the learning unit 26 derives a difference between an extraction result by the neural network and the correct answer data 43 as a loss, and learns the connection weights and kernel coefficients of the neural network such that the loss is equal to or less than a predetermined threshold value.

Then, the learning unit 26 repeatedly performs learning until the loss becomes equal to or less than a predetermined threshold value. Accordingly, in a case where the reduced liver image GS1 and the corresponding image G1 are input, the extraction model 25A for extracting the liver region included in the corresponding image G1 is constructed. Note that the learning unit 26 may repeatedly perform learning a predetermined number of times.

Figure 7:
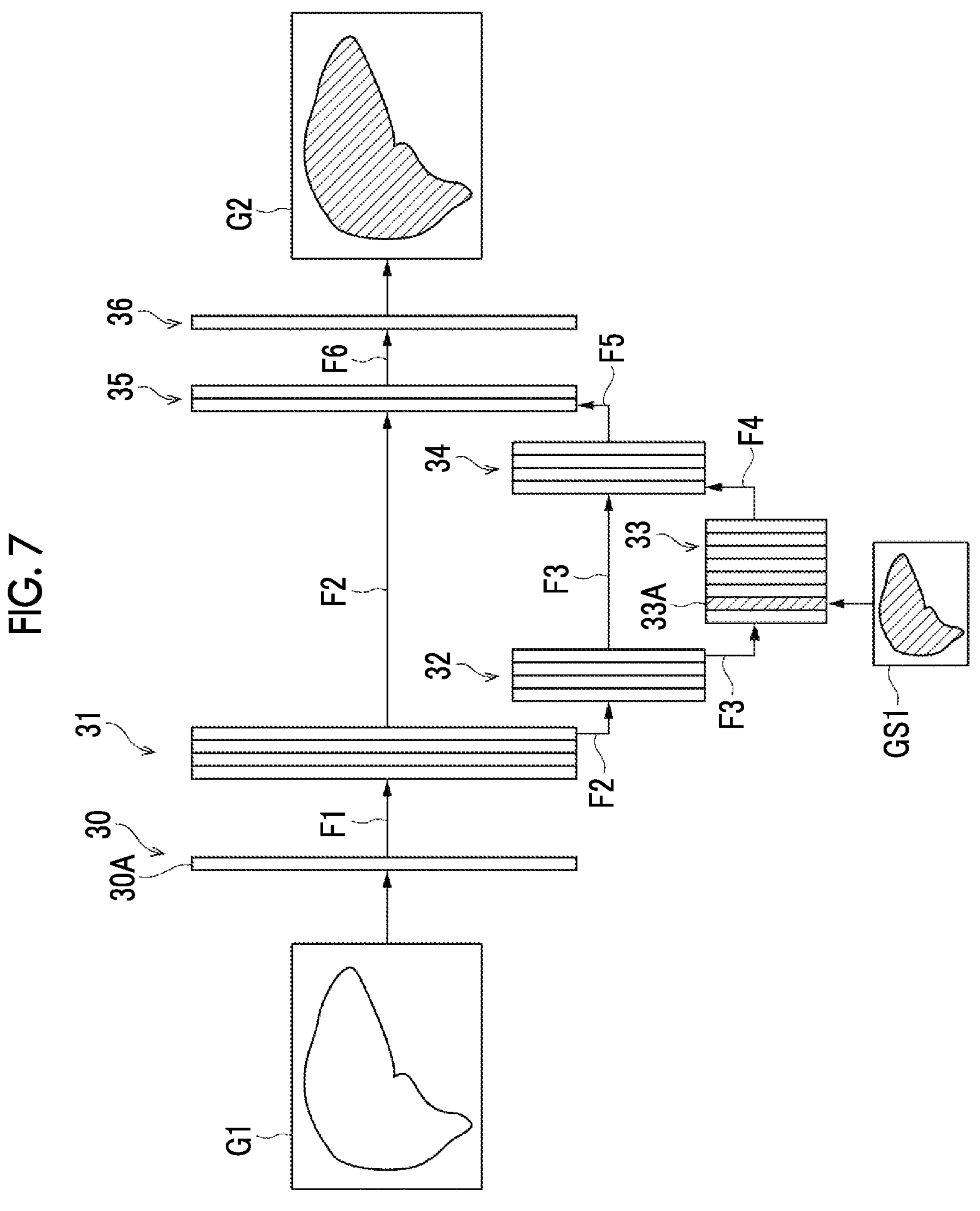
FIG. 7 is a diagram schematically showing another configuration of the extraction model.

Note that the configuration of the U-Net constituting the extraction model 25A is not limited to that shown in FIG. 6. For example, as shown in FIG. 7, the input layer 30 may be composed of only one channel 30A for input of the corresponding image G1 and a channel 33A for inputting the reduced liver image GS1 may be added to the third layer 33 in which processing is performed on the feature map F3 having the same size as the reduced liver image GS1. In this case, the third layer 33 combines and convolves the feature map F3 and the reduced liver image GS1 input to the channel 33A, and outputs the feature map F4 in which the feature map F3 and the reduced liver image GS1 are integrated.

Figure 8:
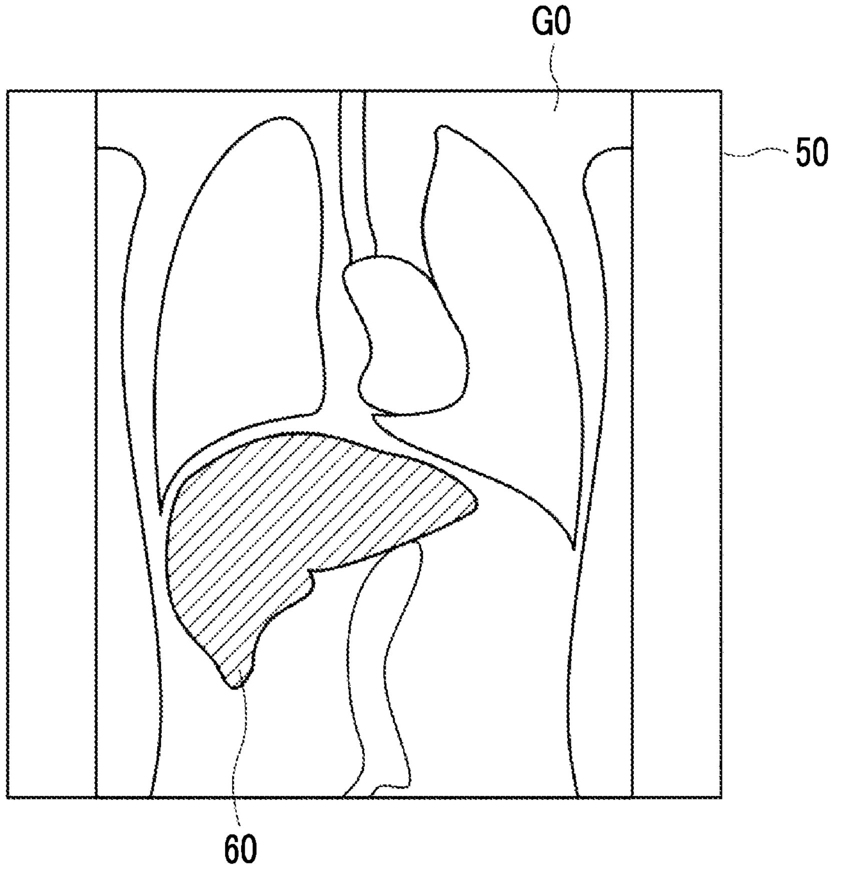
FIG. 8 is a diagram showing a display screen of a target image.

The display control unit 27 displays the target image G0 from which the liver region has been extracted on the display 14. FIG. 8 is a diagram showing a display screen of the target image. As shown in FIG. 8, a display screen 50 displays the target image G0. Further, a mask 60 based on the extracted image G2 is attached to the liver region of the displayed target image G0.

Figures 9, 10:
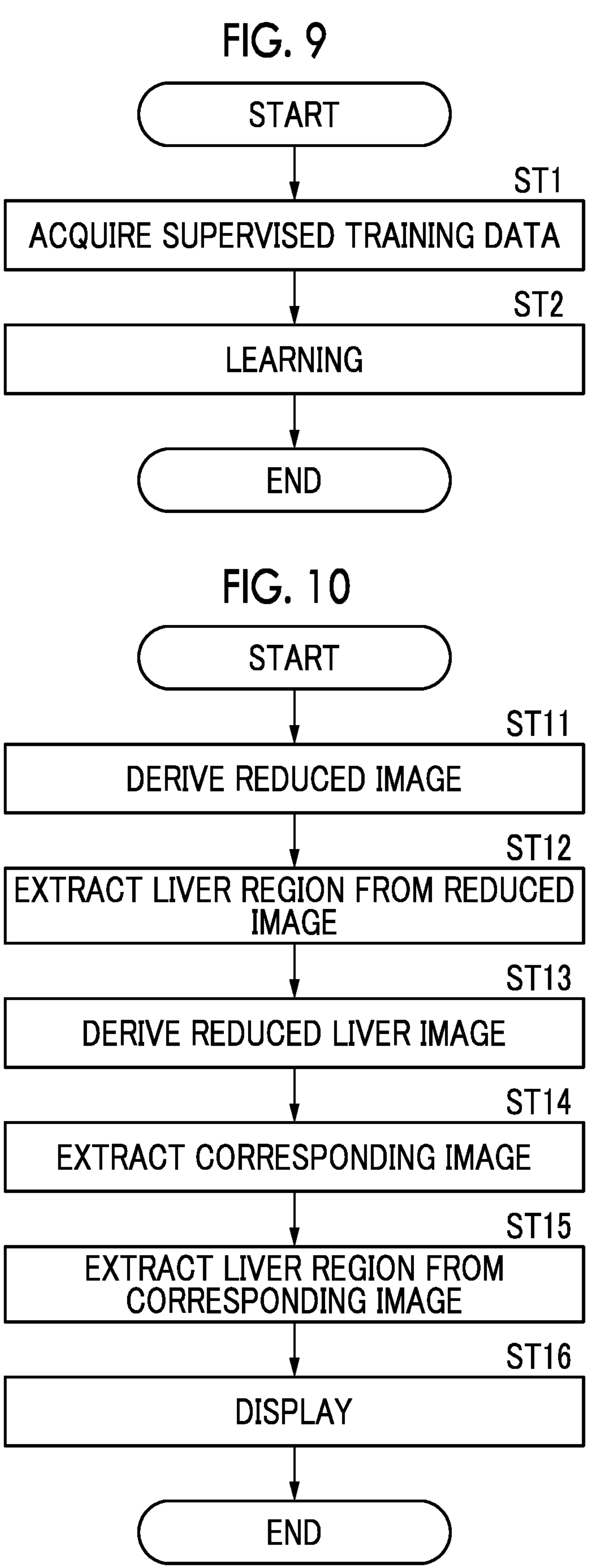
FIG. 9 is a flowchart showing learning processing performed in the present embodiment.
FIG. 10 is a flowchart showing image processing performed in the present embodiment.

Next, a process performed in the present embodiment will be described. FIG. 9 is a flowchart showing learning processing performed in the present embodiment. It is assumed that the supervised training data is acquired from the image storage server 3 and is saved in the storage 13. The learning unit 26 acquires the supervised training data saved in the storage 13 (Step ST1), and uses the supervised training data to perform U-Net learning (Step ST2). Thereby, the extraction model 25A is constructed.

FIG. 10 is a flowchart showing image processing performed in the present embodiment. It is assumed that the target image G0 is acquired from the image storage server 3 and is saved in the storage 13. First, the reduction unit 22 reduces the target image G0 to derive the reduced image GS0 (Step ST11). Next, the first extraction unit 23 extracts a liver region from the reduced image GS0 (Step ST12), and derives the reduced liver image GS1 by clipping the rectangular region including the liver region in the reduced image GS0 (Step ST13).

Subsequently, the second extraction unit 24 extracts a region corresponding to the reduced liver image GS1 from the target image G0 as the corresponding image G1 (Step ST14). Then, the third extraction unit 25 extracts the liver region from the corresponding image G1 (Step ST15). Further, the display control unit 27 displays the target image G0 from which the liver region has been extracted on the display 14 (Step ST16), and the process ends.

Figure 11:
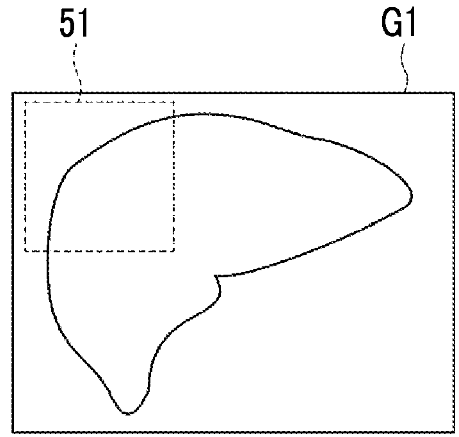
FIG. 11 is a diagram for describing a receptive field for a liver region.

Here, extracting the liver region from the corresponding image G1 in a state where no information is given about the liver region is considered. In this case, as shown in FIG. 11, it is necessary to make the hierarchy of the neural network that constitutes the extraction model 25A deep (that is, to increase the number of layers) such that a large receptive field 51 capable of extracting features from the inside to the outside of the liver region as well as the boundary of the liver region can be obtained.

However, in a case where the hierarchy of the neural network is deepened, the processing time for learning and extraction becomes long, and thus a large amount of memory for processing is required. In addition, more supervised training data is required for learning.

In addition, in a case where an attempt is made to extract a liver region from a part region of the human body as in the corresponding image G1, information around the liver region is largely missing. For this reason, learning is difficult with a normal neural network, and there is a likelihood that the liver region cannot be extracted with high accuracy.

Figure 12:
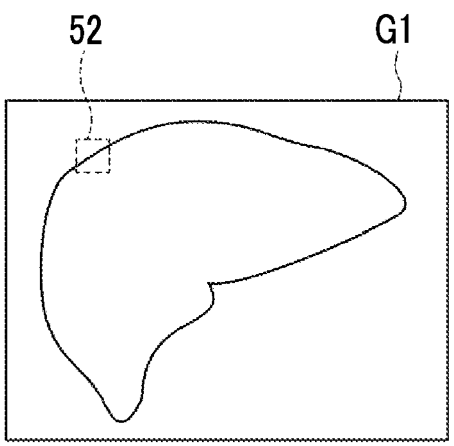
FIG. 12 is a diagram for describing a receptive field for a liver region.

In the present embodiment, the corresponding image G1 and the reduced liver image GS1 are input to the extraction model 25A to extract the liver region included in the corresponding image G1. Here, a rough extraction result of the liver region included in the corresponding image G1 is known from the reduced liver image GS1. For this reason, it is only necessary to train the extraction model 25A such that only the boundary portion between the liver and the other region included in the corresponding image G1 can be discriminated. That is, as shown in FIG. 12, it is only necessary to obtain a small receptive field 52 enough to extract features around the boundary between the liver region and the other region. For this reason, it is possible to reduce the number of layers of the neural network that constitutes the extraction model 25A, and thus a large amount of memory for processing is not required. Therefore, it is possible to extract the liver region from the corresponding image G1 at high speed and with high accuracy.

Figure 13:
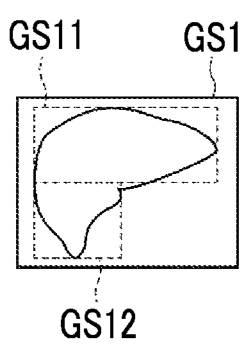
FIG. 13 is a diagram for describing division of a liver region.
Figure 13:
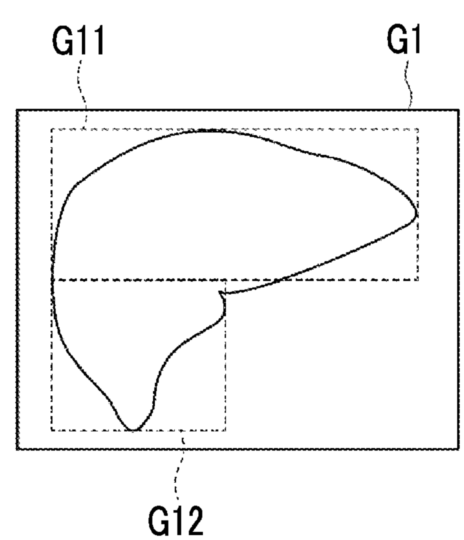

In addition, in the above embodiment, the first extraction unit 23 may divide the extracted liver region and derive a divided and reduced liver image including each of the divided liver regions. FIG. 13 is a diagram for describing the division of the liver region. As shown in FIG. 13, the first extraction unit 23 divides the liver region extracted from the reduced image GS0 into an upper region and a lower region, and derives a first reduced liver image GS11 and a second reduced liver image GS12. In this case, the second extraction unit 24 extracts a first corresponding image G11 corresponding to the first reduced liver image GS11 and a second corresponding image G12 corresponding to the second reduced liver image GS12 from the target image G0. The first reduced liver image GS11 and the second reduced liver image GS12 are examples of divided and reduced structure images, and the first corresponding image G11 and the second corresponding image G12 are examples of divided corresponding images.

Further, the third extraction unit 25 inputs the first reduced liver image GS11 and the first corresponding image G11 into the extraction model 25A, and extracts an upper liver region from the first corresponding image G11. Further, the third extraction unit 25 inputs the second reduced liver image GS12 and the second corresponding image G12 into the extraction model 25A, and extracts a lower liver region from the second corresponding image G12.

In this way, by dividing the liver region into upper and lower regions, particularly for the lower region of the liver, there is no need to process the region on the right side of the liver as compared with the case where the corresponding image G1 and the reduced liver image GS1 are used. Therefore, the amount of calculation performed by the extraction model 25A can be reduced, and as a result, extraction of the liver region can be performed at a higher speed.

Here, in the case of dividing the liver region, it is preferable to train the extraction model 25A using supervised training data in which the mode of division is variously changed. Accordingly, in a case where the liver region is divided, the robustness in the case where the extraction model 25A extracts the liver region from the corresponding image G1 can be improved.

In the above embodiment, the liver is used as the object included in the target image G0, but the object is not limited to the liver. In addition to the liver, the object can be any part of a human body such as a heart, lung, brain, and limbs.

Further, in the above embodiment, the CT image is used as the target image G0, but the present disclosure is not limited thereto. In addition to a three-dimensional image such as an MRI image, any image such as a radiation image acquired by simple imaging can be used as the target image G0.

Further, in the above embodiment, for example, as hardware structures of processing units that execute various kinds of processing, such as the information acquisition unit 21, the reduction unit 22, the first extraction unit 23, the second extraction unit 24, the third extraction unit 25, the learning unit 26, and the display control unit 27, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example in which a plurality of processing units are configured by one processor, first, there is a form in which one processor is configured by a combination of one or more CPUs and software as typified by a computer, such as a client or a server, and this processor functions as a plurality of processing units. Second, there is a form in which a processor for realizing the function of the entire system including a plurality of processing units via one integrated circuit (IC) chip as typified by a system on chip (SoC) or the like is used. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. An image processing apparatus comprising at least one processor, wherein the processor is configured to:

acquire a target image;

reduce the target image to derive a reduced image of the target image;

extract a first region from the reduced image to derive a reduced structure image including the first region by a first extraction model without rest of structures of the reduced image;

extract, from the target image, a region which corresponds to the reduced structure image in a corresponding image;

derive an enlarged structure image by enlarging the reduced structure image to be a same size and same resolution as the corresponding image;

input the corresponding image and the enlarged structure image respectively into two channels of an input layer of a second extraction model which is constructed by machine-learning a neural network and includes a plurality of processing layers that perform convolution processing and the input layer which has at least two channels as the second extraction model outputs an extracted image in which a second region of a target structure is included, wherein the extracted image is obtained by extracting the target structure from the corresponding image.

2. The image processing apparatus according to claim 1, wherein the processor is configured to:

divide the region of the target structure extracted from the reduced image and derive a divided and reduced structure image including each of the divided regions of the target structure;

derive a plurality of divided corresponding images corresponding to the respective divided and reduced structure images from the corresponding image; and extract the region of the target structure included in the corresponding image in units of the divided corresponding image and the divided and reduced structure image.

3. A learning apparatus comprising at least one processor, wherein the processor is configured to:

acquire a reduced structure image including a first region of a target structure, wherein the reduced structure image is derived based on a reduced image of a target image by extracting the first region of the target structure from the reduced image without rest of structures of the reduced image by a first extraction model;

acquire a corresponding image which is extracted from a region of the target image and corresponds to the reduced structure image, wherein an enlarged structure image is to be derived by enlarging the reduced structure image to be a same size and same resolution as the corresponding image; and construct an extraction model that is configured to extract an extracted image which includes a second region of the target structure from the corresponding image, by machine-learning a neural network using, as supervised training data, a first image including the first region of the target structure extracted from the reduced structure image of the target image including the target structure, a second image corresponding to the corresponding image, and correct answer data representing an extraction result of the target structure from the second image, wherein the extraction model includes an input layer having two channels and a plurality of processing layers that perform convolution processing, the input layer is configured to receive the corresponding image and the enlarged structure.

4. An image processing method comprising:
acquiring a target image;
reducing the target image to derive a reduced image of the target image;
extracting a first region from the reduced image to derive a reduced structure image including the first region by a first extraction model without rest of structures of the reduced image;
extracting, from the target image, region which corresponds to the reduced structure image in a corresponding image;
deriving an enlarged structure image by enlarging the reduced structure image to be a same size and same resolution as the corresponding image;
inputting the corresponding image and the enlarged structure image respectively into two channels of an input layer of a second extraction model which is constructed by machine-learning a neural network and includes a plurality of processing layers that perform convolution processing and the input layer which has at least two channels as the second extraction model outputs an extracted image in which a second region of a target structure is included, wherein the extracted image is obtained by extracting the target structure from the corresponding image.

5. A learning method comprising:
acquiring a reduced structure image including a first region of a target structure, wherein the reduced structure image is derived based on a reduced image of a target image by extracting the first region of the target structure from the reduced image without rest of structures of the reduced image by a first extraction model;
acquiring a corresponding image which is extracted from the target image and corresponds to the reduced structure image, wherein an enlarged structure image is to be derived by enlarging the reduced structure image to be a same size and same resolution as the corresponding image; and
constructing an extraction model that is configured to extract an extracted image which includes a second region of the target structure from the corresponding image, by machine-learning a neural network using, as supervised training data, a first image including the first region of the target structure extracted from the reduced structure image of the target image including the target structure, a second image corresponding to the corresponding image, and correct answer data representing an extraction result of the target structure from the second image, wherein the extraction model includes an input layer having two channels and a plurality of processing layers that perform convolution processing, the input layer is configured to receive the corresponding image and the enlarged structure.

6. A non-transitory computer-readable storage medium that stores an image processing program for causing a computer to execute:
acquiring a target image;
reducing the target image to derive a reduced image of the target image;
extracting a first region from the reduced image to derive a reduced structure image including the first region by a first extraction model without rest of structures of the reduced image;
extracting, from the target image, region which corresponds to the reduced structure image in a corresponding image;
deriving an enlarged structure image by enlarging the reduced structure image to be a same size and same resolution as the corresponding image;
inputting the corresponding image and the enlarged structure image respectively into two channels of an input layer of a second extraction model which is constructed by machine-learning a neural network and includes a plurality of processing layers that perform convolution processing and the input layer which has at least two channels as the second extraction model outputs an extracted image in which a second region of a target structure is included, wherein the extracted image is obtained by extracting the target structure from the corresponding image.

7. A non-transitory computer-readable storage medium that stores a learning program for causing a computer to execute:
acquiring a reduced structure image including a first region of a target structure, wherein the reduced structure image is derived based on a reduced image of a target image by extracting the first region of the target structure from the reduced image without rest of structures of the reduced image by a first extraction model;
acquiring a corresponding image which is extracted from the target image and corresponds to the reduced structure image, wherein an enlarged structure image is to be derived by enlarging the reduced structure image to be a same size and same resolution as the corresponding image; and
constructing an extraction model that is configured to extract an extracted image which includes a second region of the target structure from the corresponding image, by machine-learning a neural network using, as supervised training data, a first image including the first region of the target structure extracted from the reduced structure image of the target image including the target structure, a second image corresponding to the corresponding image, and correct answer data representing an extraction result of the target structure from the second image, wherein the extraction model includes an input layer having two channels and a plurality of processing layers that perform convolution processing, the input layer is configured to receive the corresponding image and the enlarged structure.

* * * * *